United States Patent
Duane et al.

(10) Patent No.: US 9,860,059 B1
(45) Date of Patent: Jan. 2, 2018

(54) DISTRIBUTING TOKEN RECORDS

(75) Inventors: Christopher Duane, Groton, MA (US);
Robert S. Philpott, Andover, MA (US);
William Duane, Westford, MA (US);
Gareth Richards, Woodstock (GB)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 13/336,056

(22) Filed: Dec. 23, 2011

(51) Int. Cl.
*H04L 9/32* (2006.01)
*H04L 9/00* (2006.01)
*H04L 9/08* (2006.01)
*H04L 29/06* (2006.01)

(52) U.S. Cl.
CPC .......... *H04L 9/0869* (2013.01); *H04L 63/045* (2013.01); *H04L 9/0866* (2013.01)

(58) Field of Classification Search
CPC ... H04L 9/0656; H04L 9/0866; H04L 9/0869; H04L 9/0825; H04L 63/045; H04L 63/0442
See application file for complete search history.

(56) References Cited

U.S. PATENT DOCUMENTS

| | | | | |
|---|---|---|---|---|
| 6,205,549 | B1 * | 3/2001 | Pravetz | 713/182 |
| 6,226,618 | B1 * | 5/2001 | Downs et al. | 705/51 |
| 7,203,314 | B1 * | 4/2007 | Kahn et al. | 380/239 |
| 7,599,495 | B2 * | 10/2009 | Kurihara et al. | 380/201 |
| 7,891,007 | B2 * | 2/2011 | Waxman et al. | 726/27 |
| 2003/0023862 | A1 * | 1/2003 | Yamasaki et al. | 713/194 |
| 2003/0061481 | A1 * | 3/2003 | Levine et al. | 713/163 |
| 2004/0098348 | A1 * | 5/2004 | Kawasaki et al. | 705/59 |
| 2004/0196370 | A1 * | 10/2004 | Yaegashi | 348/159 |
| 2004/0255134 | A1 * | 12/2004 | Miyamoto | 713/193 |
| 2005/0154890 | A1 * | 7/2005 | Vembu | 713/171 |
| 2006/0126846 | A1 * | 6/2006 | Araki et al. | 380/277 |
| 2007/0033642 | A1 * | 2/2007 | Ganesan et al. | 726/10 |
| 2007/0130462 | A1 * | 6/2007 | Law et al. | 713/168 |
| 2007/0155306 | A1 * | 7/2007 | Koli et al. | 455/3.01 |
| 2007/0220271 | A1 * | 9/2007 | Law | 713/185 |

(Continued)

OTHER PUBLICATIONS

Rubin, Aviel D. "Independent One-Time Passwords". Jun., 1995. Usenix. pp. 1-11.*

*Primary Examiner* — Ashok Patel
*Assistant Examiner* — Abdullah Almamun
(74) *Attorney, Agent, or Firm* — Krishnendu Gupta; Jason A. Reyes

(57) ABSTRACT

A method and system for use in distributing token records is disclosed. At least one token record comprises a unique seed associated with a one-time password (OTP) token. An encryption key and a corresponding decryption key are generated for assisting selective encryption and decryption of a token record associated with a OTP token. The encryption key and the decryption key being unique to an end user of the token record. The token record is encrypted with the assistance of the encryption key. One of the decryption key and the encrypted token record is provided to the end user of the token record. The other of the decryption key and the encrypted token record is provided to the end user in response to secure receipt of the one of the decryption key and the encrypted token record by the end user. The encrypted token record can be decrypted with the assistance of the decryption key.

2 Claims, 6 Drawing Sheets

(56) References Cited

U.S. PATENT DOCUMENTS

| | | | |
|---|---|---|---|
| 2008/0059806 A1* | 3/2008 | Kishida et al. | 713/186 |
| 2008/0168543 A1* | 7/2008 | von Krogh | 726/6 |
| 2008/0168544 A1* | 7/2008 | von Krogh | 726/6 |
| 2008/0235511 A1* | 9/2008 | O'Brien et al. | 713/171 |
| 2008/0287176 A1* | 11/2008 | Bennett, III | 463/17 |
| 2009/0290711 A1* | 11/2009 | Bloom et al. | 380/239 |
| 2009/0316903 A1* | 12/2009 | Jeung | H04L 63/0838 380/271 |
| 2010/0195824 A1* | 8/2010 | Lin | H04L 9/0877 380/44 |
| 2010/0205448 A1* | 8/2010 | Tarhan et al. | 713/185 |
| 2011/0069836 A1* | 3/2011 | Rae et al. | 380/259 |
| 2011/0082799 A1* | 4/2011 | Parduhn et al. | 705/75 |
| 2011/0142234 A1* | 6/2011 | Rogers | G06F 21/35 380/247 |
| 2011/0213969 A1* | 9/2011 | Nakhjiri et al. | 713/158 |
| 2012/0233684 A1* | 9/2012 | Denis et al. | 726/9 |
| 2012/0246461 A1* | 9/2012 | Buckley et al. | 713/150 |
| 2013/0091362 A1* | 4/2013 | Poeluev | H04L 9/0841 713/179 |
| 2013/0121492 A1* | 5/2013 | Vacon | H04L 63/0492 380/270 |
| 2014/0041009 A1* | 2/2014 | Kousaka | 726/9 |

\* cited by examiner

DISTRIBUTING TOKEN RECORDS

TECHNICAL FIELD

The invention relates to distributing token records.

BACKGROUND OF THE INVENTION

Computer networks, and in particular Wide Area Networks (WANs) such as the internet, provide opportunities for the misuse and abuse of communications. For example, two users (e.g., a human user and an enterprise server) communicating via the WAN may have their communications intercepted and/or altered. Also, it is possible for one user to misrepresent his, her, or its identity to another user.

Thus, there is a need for both privacy and authentication between users of the network communicating with one another. In other words, users should be able to rely on the fact that their transmissions will not be intercepted or altered, and that transmissions from someone purporting to be a particular user do in fact originate from that user.

In many secure communication applications, a seed is required in order to perform certain cryptographic operations such as encryption, decryption, authentication, etc. The seed may comprise, by way of example, a symmetric key or other secret shared by two or more entities.

One such application is in authentication tokens, such as the RSA SecurID authentication token available from RSA, The Security Division of EMC, of Bedford, Mass., U.S.A. The RSA SecurID authentication token is used to provide two-factor authentication. Authorized users are issued individually-registered tokens that generate single-use token codes, which change based on a time code algorithm. For example, a different token code may be generated every 60 seconds. In a given two-factor authentication session, the user is required to enter a personal identification number (PIN) plus the current token code from his or her authentication token. This information is supplied to an authentication entity. The authentication entity may be a server or other processing device equipped with RSA Authentication Manager software available from RSA Security Inc. The PIN and current token code may be transmitted to the authentication entity and if the PIN and current token code are determined to be valid, the user is granted access appropriate to his or her authorization level. Thus, the token codes are like temporary passwords that cannot be guessed by an attacker, with other than a negligible probability.

Referring to FIG. 1, there is illustrated an example of a system 100 that facilitates secure communication over a network. The system 100 comprises an authentication entity, for example, a server 105 for assisting in authenticating a user 110. To enable authentication, the user 110 can communicate with a user authentication device 120 for information used to authenticate the user 110. The user authentication device 120 may be a RSA SecurID token as discussed above. The user authentication device 120 may store a seed or secret that may be used to help authenticate the user 110. Typically, the seed may be information that only is available to the authentication device 120 and the server 105. For example, the seed can be used to help generate an authentication code for the user 110. The user authentication device 120 may also access dynamic data, which, for example, can be the current time, if implemented with a running clock. Additionally, in addition to a seed, the device 120 may receive a personally selected secret from the user 110 and generate a dynamic, non-predictable authentication code value in response to the secret received from the user 110, the seed, and the current time. Here, for example, a non-predictable authentication code value may be unpredictable to anyone who does not have access to the secret received from the user 110, the stored secret, and the algorithm that generates the authentication code value.

It will be appreciated that the user 110 may have access to a communications terminal 140 such as a personal computer, a personal digital assistant (PDA) or a similar device. During the authentication process the user may read a passcode from the user authentication device 120 and enter the code manually to the communications terminal 140. Alternatively, the user authentication device 120 may communicate with the communications terminal 140 to deliver the passcode thereto. The communications terminal 140 may communicate information to the server 105 via a communications channel 170. The communications channel 170 can be any method and/or interface that enables communication of information to the server 105 that may be required to authenticate the identity of the user 110. The communications terminal 140 can communicate information generated by the user 110, the device 120, or both, to the server 105 over the communications channel 170.

In order to authenticate the user, the server 105 performs algorithmic calculations for each user authentication attempt that is substantially identical to the algorithmic calculation performed by the user authentication device 120. The server 105 compares the authentication information received over communications channel 170 and the authentication information generated by the server 105 to determine whether there is a match. If there is a match, then the server 105 can authenticate the identity of the user 110.

Referring to FIGS. 2 and 3, there is illustrated an example of a user authentication device 200 suitable for issuing a passcode for authenticating a user. The device may be a RSA authentication token comprising a LCD display 210 for issuing a passcode to a user. The device may also contain a plug portion for plugging into a USB port. This facilitates communication between the communications terminal, for example, a computer, and the device. The display 210 in FIG. 3 is illustrated in a non-energized non-operational state comprising six passcode numerals (888 888) that may represent a passcode. The display also comprises three peripheral numerals (1, 2, 3) and a diamond character (◇) located on the right side periphery thereof. Additionally, the display comprises countdown bars on the left side periphery thereof. The countdown bars may illustrate the time remaining before a new passcode is issued and displayed on the display. For example, a new passcode may be issued and displayed every sixty seconds and one countdown bar may disappear every ten seconds to illustrate the time remaining before a new passcode is displayed.

It will be appreciated that when the token as described above is created the unique seed for the token is placed into a token record. The token record may then be loaded into the authentication entity, for example, the server to allow the token to be used in an authentication event.

Accordingly, a mechanism or technique is required for delivering (e.g., securely delivering) the token records from a token manufacturer to an end customer or user to avoid the token record being revealed to an attacker. If the information in the token record is revealed to an attacker, there is a risk that the attacker may be able to use the information to the attacker's advantage.

In the past, storage media such as CD-ROMs have been used to distribute token records with token shipments.

Other techniques have also been used in the past to deliver token records to end customers.

SUMMARY OF THE INVENTION

A method and system for use in distributing token records is disclosed. At least one token record comprises a unique seed associated with a one-time password (OTP) token. An encryption key and a corresponding decryption key are generated for assisting selective encryption and decryption of a token record associated with a OTP token. The encryption key and the decryption key being unique to an end user of the token record. The token record is encrypted with the assistance of the encryption key. One of the decryption key and the encrypted token record is provided to the end user of the token record. The other of the decryption key and the encrypted token record is provided to the end user in response to secure receipt of the one of the decryption key and the encrypted token record by the end user. The encrypted token record can be decrypted with the assistance of the decryption key.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
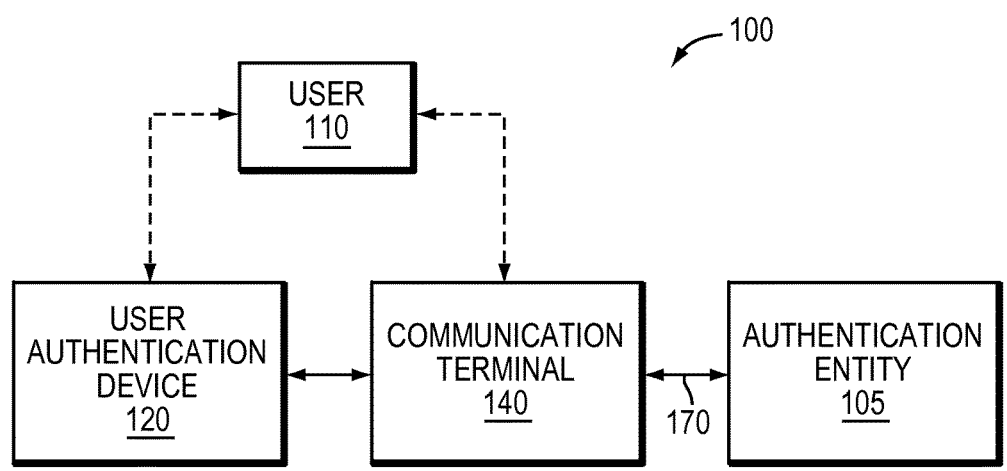
FIG. 1 is an example of a system for enabling secure communication over a network.
Figure 2:
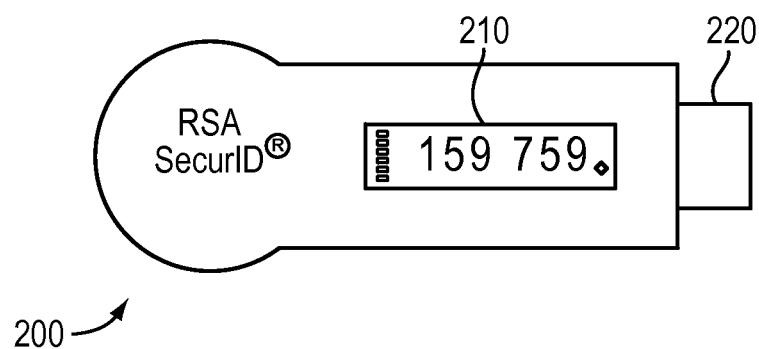
FIG. 2 is an example of a user authentication device.
Figure 3:
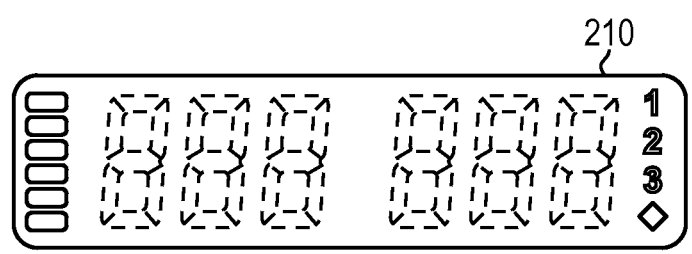
FIG. 3 is an example of a display of the device of FIG. 2.
Figure 4:
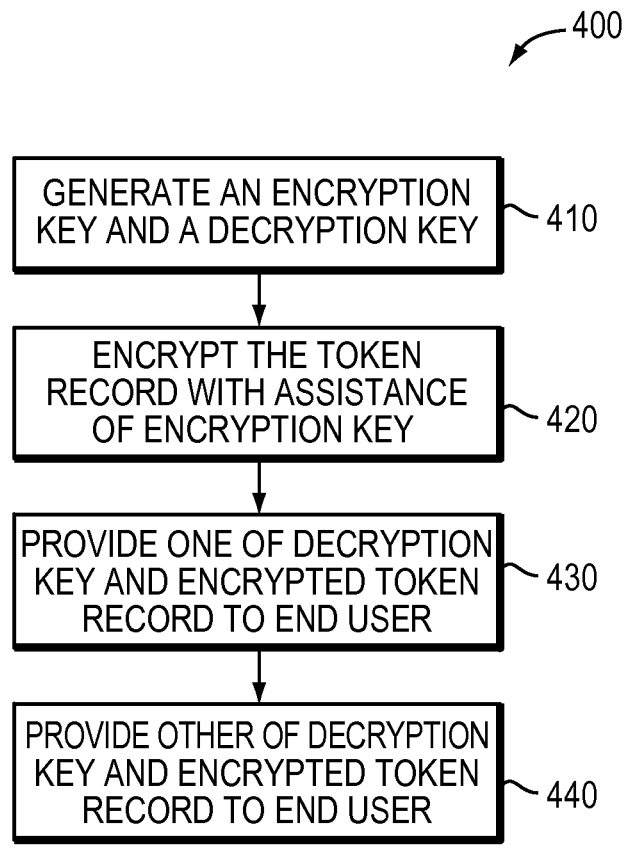
FIG. 4 is a flowchart summarizing the steps of a technique for distributing token records.

Referring to FIG. 4, there is illustrated a technique 400 for distributing token records. For example, the technique may be suitable for use in distributing token records from a token manufacturer to an end user or end customer. It will be appreciated that the end user may be an individual, a business or an organization. It will be known to those skilled in the art that one-time password (OTP) tokens, for example, RSA SecurID tokens, are individually programmed by the token manufacturer with unique seeds. The unique seed value for a token may then placed into a token record for delivering to the end user. The token record may comprise the seed along with other data such as the type of token, operational characteristics of the token, and the token serial number. It will be appreciated that the token records may be distributed to the end user so that they can be loaded onto, for example, an authentication server to allow the tokens to be used. The technique as described herein deals with the distribution of token records in a manner that substantially reduces the risk of the token records being compromised before reaching the end user.

The technique comprises generating 410 an encryption key and a corresponding decryption key for assisting selective encryption and decryption of a token record associated with a OTP token. It will be appreciated that the encryption key and the decryption key may be unique to an end user of the token record. For example, the keys may be generated in response to receiving an order for OTP tokens from the end user. It will be appreciated that the keys may be asymmetric keys such as a public-private key pair for assisting in the encryption and decryption of the token record. The public key can assist in the encryption of the token record. The private key can assist in the decryption of the encrypted token record. The technique comprises encrypting 420 the token record with the assistance of the encryption key. For example, the token record may be encrypted with the public key. The technique comprises providing 430 one of the decryption key and the encrypted token record to the end user of the token record. In this embodiment, the decryption key is provided to the end user. For example, the decryption key may be provided on a hardware device. In one embodiment, the hardware device may comprise an on-device key generation mechanism for generating a public-private key pair. The device may enable the public key to be removed from the device such that the private key only is maintained thereon. In a further embodiment, the private key may be a non-exportable key such that the private key is exclusively associated with the device. The advantage of removing the public key and maintaining the private key on the device is that the public key may be kept exclusively by the manufacturer and the private key exclusively by the end user. It will be appreciated that additionally security features may be provided in connection with the device. For example, the device may be configured such that a PIN is required to be set before the decryption key located on the device can be used. Thereafter, the PIN may be required to be entered before the device with the decryption key can be used. The technique comprises providing 440 the other of the decryption key and the encrypted token record to the end user in response to secure receipt of the one of the decryption key and the encrypted token record by the end user. The encrypted token record can be decrypted with the assistance of the decryption key. For example, if the decryption key has been provided to the end user, the manufacturer may not provide the encrypted token record to the end user until confirmation of secure receipt of the decryption key is received from the end user. The encrypted token record may be provided on a storage medium such as a CD ROM or over a network such as the internet. It will be appreciated that access to the token record will be prohibited to the end user until both the encrypted token record and the decryption key are in the end users possession.

In an exemplary implementation, the end user may be provided with the CD ROM containing the encrypted token record and the device containing the decryption key. For example, the device may comprise the private key for assisting decryption of the encrypted token record. It will be appreciated from the above that the end user will be provided with the CD ROM and the device separately. Indeed, it will be appreciated that one of the CD ROM and the device will only be provided to the end user in response to confirmation of safe receipt of the other. It will also be appreciated that a decryption software utility, for example, a client application, may be provided to the end user such that when running on a computer the client application can co-operate with the CD ROM and the device for decrypting the token record. For example, the device may be plugged into the USB port of the computer for facilitating decryption of the encrypted token record.

Figure 5:
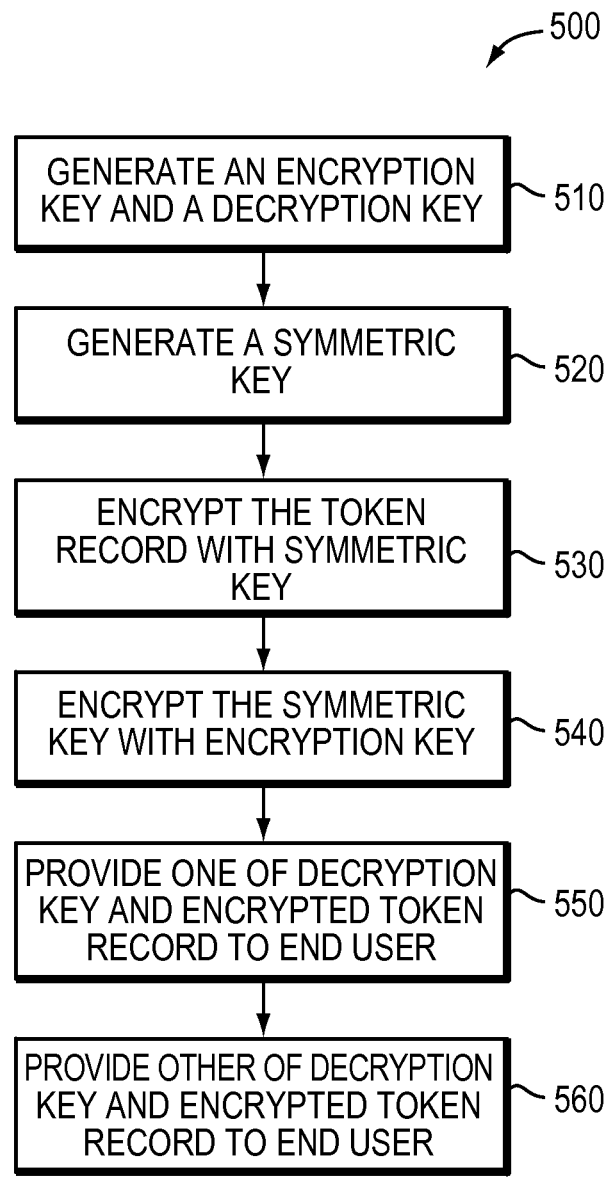
FIG. 5 is a flowchart summarizing the steps of another technique for distributing token records.

Referring to FIG. 5, there is illustrated a technique 500 for distributing token records. For example, the technique may be suitable for use in distributing token records from a token manufacturer to an end user. The technique 500 is substantially similar to the technique 400 as discussed above and comprises similar steps and similar comments apply to such steps. The technique comprises generating 510 an encryption key and a corresponding decryption key for assisting selective encryption and decryption of a token record associated with a OTP token. The encryption key and the decryption key are unique to an end user of the token record. In this embodiment, the encryption and decryption keys are asymmetric keys such as a public-private key pair. It will be appreciated as discussed above with respect to the previous figure that the public key can assist encryption of the token record and the private key can assist decryption of the encrypted token record. The technique also comprises generating 520 a symmetric key. For example, the symmetric key may be a randomly generated symmetric key. The technique comprises encrypting 530 the token record using the randomly generated symmetric key. For example, the token record may be encrypted using the symmetric key and an algorithm such as AES128. As will be discussed below in further detail, in order to avoid creating multiple encrypted files, a mechanism of encryption and enveloping of the data such as PKCS #7 is preferably utilized. The technique comprises encrypting 540 the symmetric key with the encryption key. In this embodiment, the symmetric key is encrypted with the public key such that the decryption key, for example, the private key can decrypt the encrypted symmetric key and the decrypted symmetric key can in turn decrypt the encrypted token record. The technique comprises providing 550 one of the decryption key and the encrypted token record to the end user of the token record. In this embodiment, the private key is provided on a device as discussed with respect to the previous figure to the end user. The technique comprises providing 560 the other of the decryption key and the encrypted token record to the end user in response to secure receipt of the one of the decryption key and the encrypted token record by the end user. For example, if the decryption key has already been provided, the encrypted token record is provided to the end user in response to receiving confirmation of safe receipt of decryption key. It will be appreciated that the encrypted token record being provided comprises both the encrypted token record and the encrypted symmetric key.

Figure 6:
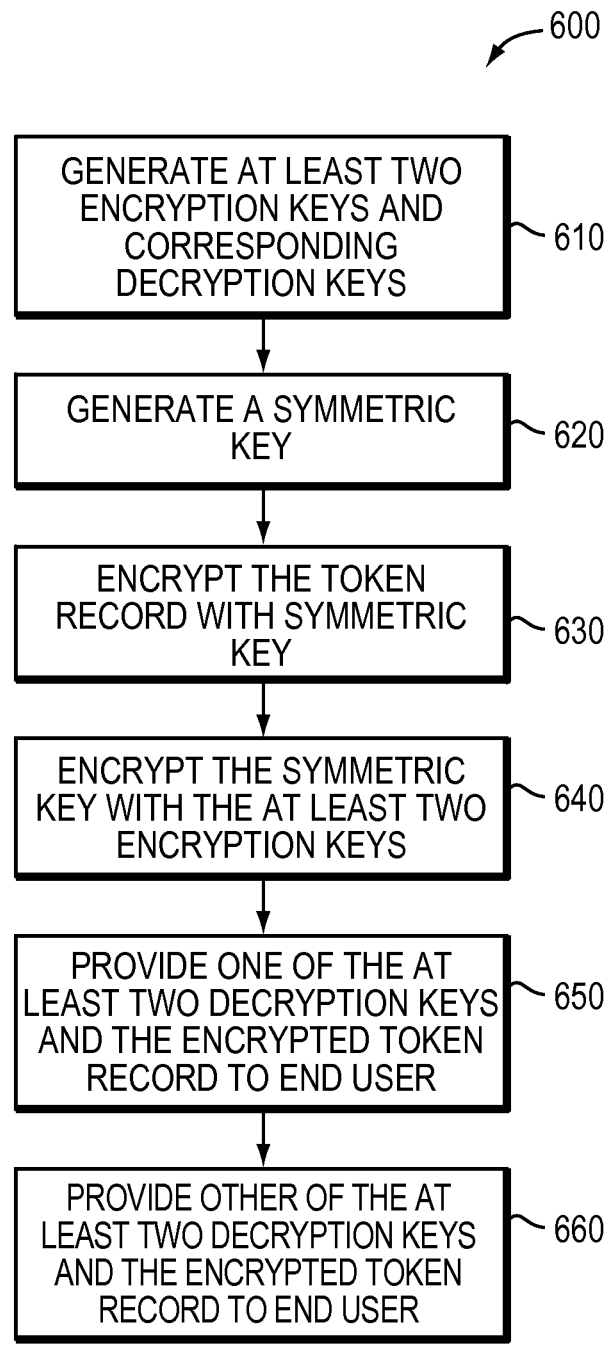
FIG. 6 is a flowchart summarizing the steps of a further technique for distributing token records.

Referring to FIG. 6, there is illustrated a technique 600 for distributing token records. For example, the technique may be suitable for use in distributing token records from a token manufacturer to an end user. The technique 600 is substantially similar to the technique 500 as discussed above and comprises similar steps and similar comments apply to such steps. The technique comprises generating at least two encryption keys and corresponding decryption keys, wherein the number of encryption and decryption keys corresponds to the number of decryption keys required by the end user. For example, the end user may be a business comprising two administrators and two decryption keys may be needed. In this embodiment, the encryption and decryption keys are public-private key pairs. The technique comprises generating 620 a symmetric key. The technique comprises encrypting the token record with the symmetric key 630. The technique comprises encrypting 640 the encrypted symmetric key with the at least two encryption keys such that any one of the at least two decryption keys can decrypt the encrypted symmetric key and the decrypted symmetric key can decrypt the encrypted token record. It will be known in the art the symmetric key may be wrapped with the at least two encryption keys. The mechanism of encryption and enveloping of the data such as PKCS #7 is preferably utilized. With this approach, any of the decryption keys associated with the end user may successfully decrypt the wrapped symmetric key which in turn can then decrypt the encrypted token record. The technique comprises providing 650 one of the at least two decryption keys and the encrypted token record to the end user of the token record. The technique comprises providing 660 the other of the at least two decryption keys and the encrypted token record to the end user in response to secure receipt of the one of the at least two decryption keys and the encrypted token record by the end user.

Figure 7:
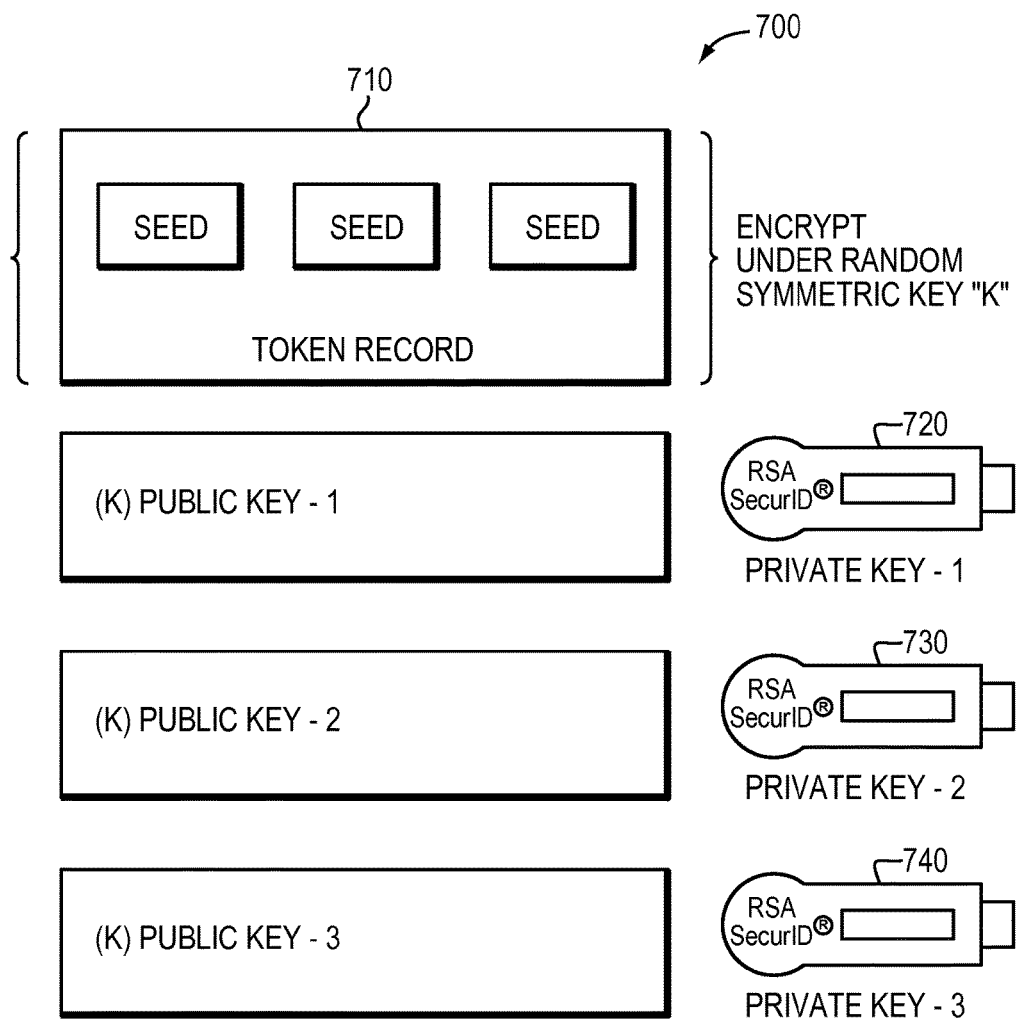
FIG. 7 is a block diagram illustrating the technique of FIG. 6 being implemented.

Referring to FIG. 7, there is illustrated a block diagram 700 of the technique as discussed with respect to FIG. 6 being implemented. There is illustrated a token record 710 comprising the seeds. The token record 710 is encrypted using a randomly generated symmetric key K. There is illustrated three public keys, namely Public Key-1, Public Key-2 and Public Key-3. The respective public keys encrypt and wrap the symmetric key K. The respective public keys also comprise corresponding private keys, namely, Private Key-1, Private Key-2 and Private Key-3. The private keys are located on devices 720, 730 and 740, respectively. It will be appreciated from the foregoing description of the technique 600 that any one of the private keys on the devices (720, 730 and 740) can be used to un-wrap the version of the symmetric key K encrypted with the mating public key. The recovered symmetric key K can in turn be used to decrypt the encrypted token record.

An advantage of the above techniques is that the techniques facilitate secure delivery of token records. The token records are encrypted to protect the sensitive information and only an end user is capable of decrypting the token records intended for that particular user. Accordingly, the token records may be shipped to an end user using insecure shipping transport. The use of such transport will have no impact on the security of the information contained in the token records as the encrypted token records can only be decrypted when the end user is in possession of both the encrypted token record and the decryption key.

While the above techniques describe generating an encryption key and a decryption key, it will be appreciated that the keys may not be generated until the identity of the end user is validated. For example, this may require the end user registering with the manufacturer before an order is processed.

While the above techniques describe generating an encryption key and a decryption key, it will be appreciated by those skilled in the art that the encryption key and the decryption key may be generated at either the token manufacturer end or at the end user end. In one embodiment, the token manufacturer may generate the encryption key and the corresponding decryption key for assisting selective encryption and decryption of a token record associated with a OTP token. In another alternative embodiment, the end user may generate the encryption key and the corresponding decryption key. For example, the end user may generate and provide the decryption key to itself as well as providing the encryption key to the token manufacturer. It will be apparent that by receiving the encryption key, the token manufacturer will be aware that the corresponding decryption key has been provided to and securely received by the end user. The token manufacturer may subsequently encrypt the token record with the assistance of the encryption key and provide the encrypted token record to the end user. However, it will be apparent to those skilled in the art that regardless of where the keys are generated the encryption key will be provided to and maintained exclusively by the manufacturer and the decryption key will be provided to and maintained exclusively by the end user.

While the above techniques describe providing the end user with a hardware device comprising the decryption key, it will be appreciated that end user may be provided with a file comprising the decryption key for assisting in the decryption of the encrypted token record.

While the techniques describe encrypting the token record and subsequently providing one of the encrypted token record and decryption key to the end user, it will be appreciated in certain instances the decryption key may be provided to the end user before encrypting the token record with the assistance of the encryption key.

While the invention has been disclosed in connection with preferred embodiments shown and described in detail, modifications and improvements thereon will become readily apparent to those skilled in the art. Accordingly, the spirit and scope of the present invention should be limited only by the following claims.

What is claimed is:

1. A method for use in the distribution of seed data that enables validation at an authentication server of one-time passwords (OTP's) issued by a OTP token device, the method comprising:
    generating a symmetric key;
    encrypting data with the symmetric key and an Advanced Encryption Standard (AES) algorithm, wherein the data comprises a seed for use by the authentication server in validating OTP's issued by the OTP token device;
    generating, by an on-device key generation mechanism of a hardware device, a public-private key pair;
    extracting, from the hardware device, the public key of the public-private key pair;
    maintaining, by the hardware deviice, the private key of the public-private key pair;
    encrypting the symmetric key with the public key of the public-private key pair in a manner that wraps the symmetric key, wherein the private key unwraps the symmetric key and the symmetric key decrypts the encrypted data, wherein the symmetric key is encrypted utilizing Public-Key Cryptography Standard (PKCS);
    providing the encrypted data and the encrypted symmetric key on a computer-readable medium, wherein the computer-readable medium is separate to the hardware device and the OTP token device;
    distributing one of the hardware device and the computer-readable medium to an entity that ordered the OTP token device;
    receiving a confirmation that the entity has received the distributed one of the hardware device and the computer-readable medium, wherein the receipt of the confirmation enables distribution of the other of the hardware device and the computer-readable medium to the entity; and
    in response to receiving the confirmation, distributing the other of the hardware device and the computer-readable medium to the entity for enabling the entity to obtain the seed from the encrypted data on the computer-readable medium with the assistance of the private key on the hardware device and use the seed at the authentication server to validate OTP's issued by the OTP token device.

2. A system for use in the distribution of seed data that enables validation at an authentication server of one-time passwords (OTP's) issued by a OTP token device, the system comprising:
    a processor and memory;
    the system configured to:
    generate a symmetric key;
    encrypt data with the symmetric key and an Advanced Encryption Standard (AES) algorithm, wherein the data comprises a seed for use by the authentication server in validating OTP's issued by the OTP token device;
    generate, by an on-device key generation mechanism of a hardware device, a public-private key pair;
    extract, from the hardware device, the public key of the public-private key pair;
    maintain, by the hardware device, the private key of the public-private key pair;
    encrypt the symmetric key with the public key of the public-private key pair in a manner that wraps the symmetric key, wherein the private key unwraps the symmetric key and the symmetric key decrypts the encrypted data, wherein the symmetric key is encrypted utilizing Public-Key Cryptography Standard (PKCS);
    provide the encrypted data and the encrypted symmetric key on a computer-readable medium, wherein the computer-readable medium is separate to the hardware device and the OTP token device;
    distribute one of the hardware device and the computer-readable medium to an entity that ordered the OTP token device;
    receive a confirmation that the entity has received the distributed one of the hardware device and the computer-readable medium, wherein the receipt of the confirmation enables distribution of the other of the hardware device and the computer-readable medium to the entity; and
    in response to receiving the confirmation, distribute the other of the hardware device and the computer-readable medium to the entity for enabling the entity to obtain the seed from the encrypted data on the computer-readable medium with the assistance of the private key on the hardware device and use the seed at the authentication server to validate OTP's issued by the OTP token device.

\* \* \* \* \*